(12) United States Patent
Lei et al.

(10) Patent No.: US 12,191,781 B2
(45) Date of Patent: Jan. 7, 2025

(54) CONNECTING DEVICE FOR PARALLEL OPERATION OF ENERGY STORAGE INVERTERS

(71) Applicant: SHENZHEN POWEROAK NEWENER CO., LTD, Shenzhen (CN)

(72) Inventors: Jianhua Lei, Shenzhen (CN); Yongliang You, Shenzhen (CN); Geng Qin, Shenzhen (CN); Hui Ma, Shenzhen (CN); Zhongping Meng, Shenzhen (CN)

(73) Assignee: SHENZHEN POWEROAK NEWENER CO., LTD, Shenzhen (CN)

( * ) Notice: Subject to any disclaimer, the term of this patent is extended or adjusted under 35 U.S.C. 154(b) by 0 days.

(21) Appl. No.: 18/395,999

(22) Filed: Dec. 26, 2023

(65) Prior Publication Data

US 2024/0380336 A1 Nov. 14, 2024

Related U.S. Application Data

(63) Continuation of application No. PCT/CN2023/121204, filed on Sep. 25, 2023.

(30) Foreign Application Priority Data

May 11, 2023 (CN) .......................... 202310528762.8

(51) Int. Cl.
*H02M 7/49* (2007.01)
*H02J 3/38* (2006.01)
(Continued)

(52) U.S. Cl.
CPC ............. *H02M 7/493* (2013.01); *H02J 3/381* (2013.01); *H02J 3/40* (2013.01); *H02J 3/42* (2013.01);
(Continued)

(58) Field of Classification Search
CPC .......... H02M 7/493; H02M 1/36; H02J 3/381; H02J 3/40; H02J 3/42; H02J 3/44; H02J 3/46
See application file for complete search history.

(56) References Cited

U.S. PATENT DOCUMENTS

2017/0047740 A1* 2/2017 Narla ...................... H02J 3/381
2018/0048159 A1* 2/2018 Narla ...................... H02J 3/381
2018/0131226 A1* 5/2018 Narla ...................... H02J 3/381

* cited by examiner

*Primary Examiner* — Kyle J Moody
*Assistant Examiner* — Jye-June Lee
(74) *Attorney, Agent, or Firm* — IPRO, PLLC

(57) ABSTRACT

A parallel operation connecting device includes a control switch, a concentrator, a first connector and a second connector; the concentrator is connected between an alternating current power supply and the first connector and the second connector to form two identical alternating current lines, and on-off of both the two alternating current lines is controlled by the control switch; the control switch is configured to simultaneously switch on the two alternating current lines when the first connector is connected to the first energy storage inverter and the second connector is connected to the second energy storage inverter and simultaneously switch off the two alternating current lines when the first connector is disconnected from the first energy storage inverter and/or when the second connector is disconnected from the second energy storage inverter.

18 Claims, 3 Drawing Sheets

(51) Int. Cl.
*H02J 3/40* (2006.01)
*H02J 3/42* (2006.01)
*H02J 3/44* (2006.01)
*H02J 3/46* (2006.01)
*H02M 1/36* (2007.01)
*H02M 7/493* (2007.01)

(52) U.S. Cl.
CPC *H02J 3/44* (2013.01); *H02J 3/46* (2013.01); *H02M 1/36* (2013.01)

CONNECTING DEVICE FOR PARALLEL OPERATION OF ENERGY STORAGE INVERTERS

CROSS-REFERENCE TO RELATED APPLICATION

The present application claims priority to Chinese Patent Application No. 202310528762.8, filed with the Chinese Patent Office on May 11, 2023 and entitled "PARALLEL OPERATION CONNECTING DEVICE AND PARALLEL OPERATION APPARATUS", the entirety of which is incorporated herein by reference.

TECHNICAL FIELD

The present application relates to the technical field of new energy, in particular relates to the related technology of parallel operation of energy storage inverters, and especially relates to the mains supply input technology during parallel operation of portable bidirectional energy storage inverters.

BACKGROUND

With recognition of the public for portable energy storage inverters, there are more and more calls for parallel operation of portable energy storage inverters on the market, and the portable energy storage inverters are expected to realize parallel operation function (combined power being provided for occasional connection with a heavy load) of high reliability as well as fast and convenient operation, thereby meeting requirements of simple operation by ordinary people. The portable energy storage inverters currently available have changed from the traditional off-grid inverter mode with unidirectional discharging of battery (as shown in FIG. 1) to the mainstream bidirectional inverter topology technology (as shown in FIG. 2) with the bypass function of backup UPS (Uninterruptible Power Supply).

As shown in FIG. 1, the traditional off-grid inverter with unidirectional discharging of battery only has the function of discharging from the battery to supply power to the load, and during alternating current (AC) charging, the accumulator battery needs to be charged through a charging adapter. This kind of topological structure and the control method thereof are relatively simple. However, disadvantages thereof lie in that: generally, the charging current of the adapter is small, and an external charger is required, so that the cost is relatively higher than that of the bidirectional inverter topology; moreover, this kind of topological structure does not have the function of automatically switching to supplying power to the load from the battery through the inverting operation when the mains supply fails, that is, it does not have the UPS function (backup function) of automatically switching to supplying power to the load from the mains supply after the mains supply resumes. Because it is an off-grid inverter with unidirectional discharging, there is no problem of mains supply inputting during parallel operation, and it is relatively simple to realize power expansion by parallel operation of inverters. However, this topology has no technical advantage in the current portable energy storage market. Even if parallel operation is realized, the new product is gradually eliminated because of shortcomings such as a slow charging speed and incapability of supplying power to a load when the battery having run out of power is being charged.

FIG. 2 is the mainstream application topology of portable energy storage inverters and even commercial energy storage apparatuses currently available, and this topology has advantages of being capable of realizing quick battery charging, being simple in circuit, and having a UPS bypass function or the like. The portable energy storage apparatus is characterized by its convenience-simple operation, light weight, convenient handling or the like, and it has evolved into an ordinary household electronic product that can be operated by ordinary people, so that it requires higher reliability. For stand-alone use, the technology is relatively mature at present, but there are still many challenges for the parallel operation function. For example, how to ensure the same frequency and same phase of the mains supply input for two energy storage inverters and how to ensure that the two energy storage inverters are powered-off and powered-on simultaneously are still problems to be solved. Different frequency and different phase of mains supply input during parallel operation of the two energy storage inverters or incapability of being powered off and powered on at the same time will all pose security risks and reduce the reliability of parallel operation.

SUMMARY

According to one aspect of the present application, a parallel operation connecting device is provided which includes a control switch, a concentrator, a first connector and a second connector; the concentrator is connected between an alternating current power supply and the first connector and the second connector to form two identical alternating current lines, and on-off of both the two alternating current lines is controlled by the control switch; the first connector is configured to be adaptively connected with a first energy storage inverter, the second connector is configured to be adaptively connected with a second energy storage inverter; the connection of the control switch is configured such that: when the first connector is connected to the first energy storage inverter and the second connector is connected to the second energy storage inverter, the control switch is turned on to simultaneously switch on the two alternating current lines; when the first connector is disconnected from the first energy storage inverter and/or when the second connector is disconnected from the second energy storage inverter, the control switch is turned off to simultaneously switch off the two alternating current lines.

Furthermore, a collector wire is built in the concentrator, and a switch component of the control switch is connected to the collector wire for controlling the on-off of the collector wire; a first end of the collector wire is connected with the alternating current power supply, a second end of the collector wire is connected with an electrical connection wire of the first connector to form a first alternating current line; the second end of the collector wire is further connected with an electrical connection wire of the second connector to form a second alternating current line, and the first alternating current line and the second alternating current line are the two identical alternating current lines.

Furthermore, there are three electrical connection wires for each of the first connector and the second connector, which correspond to live wire, neutral wire and ground wire respectively.

Furthermore, each of the first connector and the second connector has a signal wire, and the signal wires of the first connector and the second connector are respectively connected with both ends of a control component of the control switch; when the first connector is connected to the first energy storage inverter and the second connector is connected to the second energy storage inverter, both ends of the control component of the control switch form a control loop through the signal wire of the first connector, an internal line of the first energy storage inverter, an internal line of the second energy storage inverter and the signal wire of the second connector to control the control switch to be turned on.

Furthermore, when one of the first connector and the second connector is not connected to the energy storage inverter, both ends of the control component of the control switch fail to form a control loop through the signal wire of the first connector, the internal line of the first bidirectional energy storage inverter, the internal line of the second energy storage inverter and the signal wire of the second connector, and the control component of the control switch loses power so that the switch component of the control switch is turned off.

Furthermore, each of the first connector and the second connector has a first signal wire, a second signal wire and a third signal wire; one end of the control component of the control switch is connected to the first signal wire of the first connector and the other end of the control component is connected to the third signal wire of the second connector; the second signal wire of the first connector is connected with the second signal wire of the second connector; when the connector is connected with the energy storage inverter, the first signal wire, the second signal wire and the third signal wire are correspondingly connected with a first interface, a second interface and a third interface of the energy storage inverter respectively, wherein the first interface and the second interface of the energy storage inverter are respectively a power supply terminal and a ground terminal of the energy storage inverter, and the second interface of the energy storage inverter is connected with the third interface of the energy storage inverter.

Furthermore, each of the first connector and the second connector has a fourth signal wire, and the fourth signal wire is connected with the second signal wire within the connector; when the connector is connected with the energy storage inverter, the fourth signal wire is connected with a fourth interface of the energy storage inverter to provide the energy storage inverter with an identification signal indicating connection with the connector.

Furthermore, the control switch is a relay, the control switch has a contact set and a control coil, wherein the contact set is connected to the collector wire of the concentrator for controlling the on-off of the collector wire, one end of the control coil is connected to the first signal wire of the first connector, and the other end of the control coil is connected to the third signal wire of the second connector.

Furthermore, the first connector is a plug for connecting with the first energy storage inverter, and the second connector is a plug for connecting with the second energy storage inverter.

Furthermore, the concentrator, the first connector and the second connector are integrally formed.

Furthermore, the parallel operation connecting device further includes a plug for connecting with the alternating current power supply, wherein one end of the plug for connecting with the alternating current power supply are capable of being inserted into an alternating current power supply socket, and the other end of the plug is connected with the concentrator.

According to another aspect of the present application, a parallel operation apparatus is provided which includes the aforesaid parallel operation connecting device, and a first energy storage inverter and a second energy storage inverter connected to the parallel operation connecting device.

Furthermore, a first detection circuit is arranged in the first energy storage inverter for detecting whether the first energy storage inverter is connected to one of the two identical alternating current lines; a second detection circuit is arranged in the second energy storage inverter for detecting whether the second energy storage inverter is connected to the other of the two identical alternating current lines.

BRIEF DESCRIPTION OF THE DRAWINGS

One or more embodiments are illustrated by pictures in corresponding attached drawings, and this does not constitute limitation on the embodiments. Elements with the same reference numerals in the attached drawings are indicated as similar elements, and the pictures in the attached drawings do not constitute scale limitation unless otherwise stated particularly.

DETAILED DESCRIPTION

Hereinafter, the present application will be further explained with reference to the attached drawings and specific embodiments and examples. The examples are provided for illustration only, and are not intended to limit the present application. It should be noted that, words such as "first", "second", "third" and "fourth" are only used to distinguish components (e.g., terminals and pins or the like). As shall be appreciated, these components should not be limited by these words, and these words do not mean that these components have the above-mentioned ordinal numbers, nor do they represent the arrangement order or the manufacturing order of various components.

Figure 1:
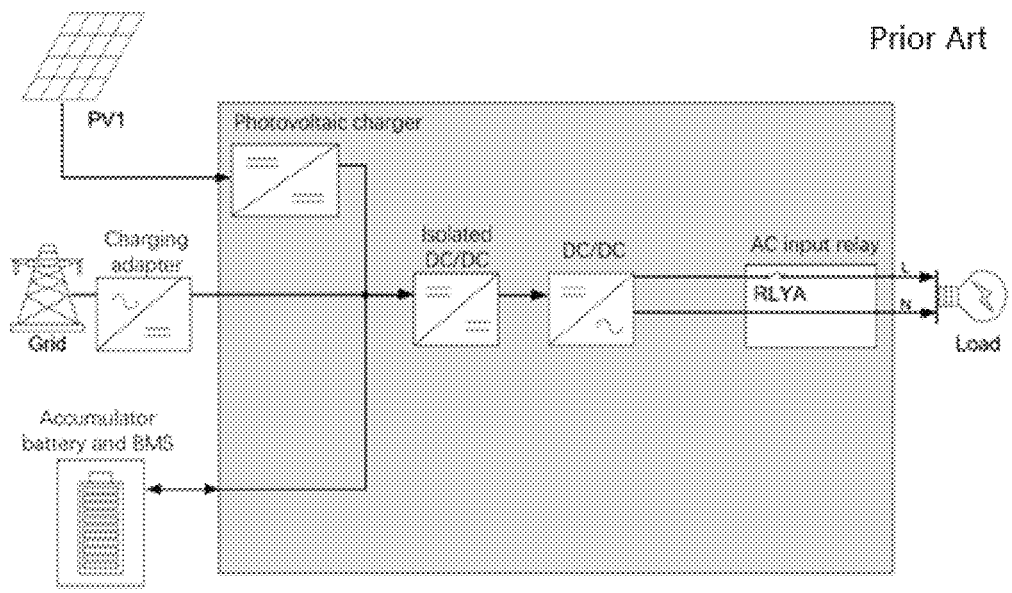
FIG. 1 is a schematic view of a traditional off-grid inverter with unidirectional discharging of battery.
Figure 2:
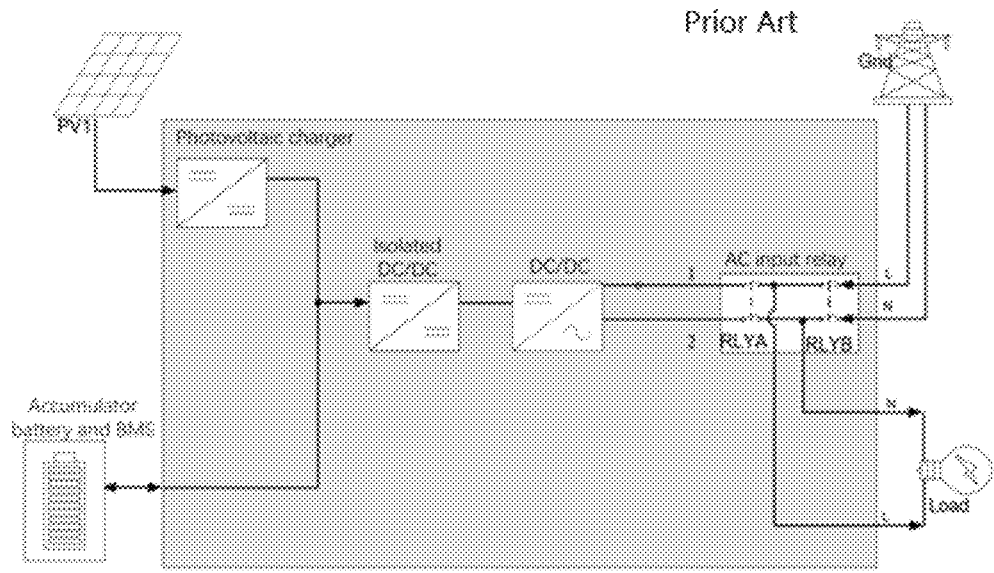
FIG. 2 is a schematic view of the current mainstream bidirectional inverter topology.

Illustration of symbols:
PV1: Photovoltaic input source
Grid: Mains supply
BMS: Battery management system
RLYA: Relay A
RLYB: Relay B FIG. 2 shows a mainstream application topology of the portable energy storage inverters and even commercial energy storage apparatuses currently available, and the topology has the advantages of being capable of realizing quick battery charging, being simple in circuit, and having a UPS bypass function or the like. However, for the energy storage inverters of such topology, in order to realize the parallel operation of two portable energy storage apparatuses with bidirectional inverter function, it is necessary to solve the problems of ensuring that the mains supply input for the two inverters operating in parallel is of the same frequency and the same phase and the inverters are powered off and powered on simultaneously.

For example, the same frequency of mains supply input requires the mains supply input to the access lines of two bidirectional energy storage inverters to be consistent, and the case where one inverter is connected to the generator and the other inverter is connected to the mains supply is not allowed. For example, the double-live wire power grid in the United States and Japan perhaps is more likely to be wrongly connected.

For example, the same phase of mains supply input requires the access lines of the two independent bidirectional energy storage inverters to be connected with the L/N wires properly (as shown in FIG. 2, for example, for the AC connection ends 1 and 2 of the energy storage inverters, all of the AC connection ends 1 of the two energy storage inverters need to be connected with the live wire and all of the AC connection ends 2 of the two energy storage inverters need to be connected with the neutral wire, or all of the AC connection ends 1 of the two energy storage inverters need to be connected with the neutral wire and all of the AC connection ends 2 of the two energy storage inverters need to be connected with the live wire, and this is the right connection mode; if the AC connection end 1 of one energy storage inverter is connected with the live wire and the AC connection end 2 thereof is connected with the neutral wire, while the AC connection end 1 of the other energy storage inverter is connected with the neutral wire and the AC connection end 2 thereof is connected with the live wire, then it will cause L/N output short circuit), because the wrongly connected energy storage inverters will cause short circuit at output of the L/N wire when switched to the bypass. In addition, many sockets, e.g., two-hole sockets and four-hole sockets (into which plugs can be inserted forward and backward), among the American standard sockets in the U.S. market, the Japanese standard sockets in the Japanese market and the European standard sockets in the European market are not foolproof, so that it is difficult to ensure the same phase for the two energy storage apparatuses. When the two energy storage apparatuses are in different phases, complicated detection is needed and error is reported so that parallel operation is not allowed. If the user connects the wires without mains supply, it is more difficult to distinguish whether the wiring is correct. If the wiring is incorrect at this time, and the mains supply resumes when the battery supplies power to the load through inverting during parallel operation, then the energy storage power supply will interrupt the power supply. That is, it is necessary to repeatedly confirm whether the wiring is correct, which causes great trouble to users. Meanwhile, it is necessary to use the product manual to troubleshoot the fault.

For example, there is a great risk when two energy storage inverters in parallel operation to which the mains supply is inputted are not powered off at the same time under abnormal conditions. Because the two energy storage inverters connected in parallel are independent from each other, they have independent input lines. In case mains supply is provided after the two inverters are connected in parallel, they all take the bypass so that the mains supply supplies power to the load, and the bypass power is separate. The UPS function requires switching to supplying power to the load from the battery through inverting after the mains supply is shut off. If one of the inverters is unplugged manually or the input line of one of the inverters is accidentally loosened and dropped during the parallel operation, it will turn to the battery for power supply through inverting, while the other inverter still outputs the mains supply. This causes the mains supply and the inverted output at the output end to be forcibly connected together, and the two inverters will result in large current impact. If the voltage difference between the two inverters is large and there is a risk of forced grid connection, then it is likely to damage one of the machines. Moreover, the risk of forced grid connection is not allowed by safety regulations. Therefore, if these technical difficulties cannot be solved, then it is difficult to popularize the parallel operation of the portable bidirectional energy storage inverters, and only the parallel operation function with various restrictions can be realized by professionals with professional knowledge. Aiming at these technical problems, the present application puts forward a parallel operation solution, which can be operated by ordinary people to realize the safe and reliable parallel operation of portable bidirectional energy storage inverters.

According to an embodiment of the present application, a parallel operation apparatus is provided which includes a parallel operation connecting device and two energy storage inverters, and the parallel operation connecting device has the following functions: when two energy storage inverters are all connected with the parallel operation connecting device, the two energy storage inverters can be simultaneously connected with the AC power supply (such as the mains supply) of the same frequency and same phase through the parallel operation connecting device so as to be powered on simultaneously, and it is unnecessary to take the phase sequence into consideration during the connection between the energy storage inverters and the parallel operation connecting device. As long as one of the energy storage inverters is disconnected from the parallel operation connecting device, the AC power supply of the two energy storage inverters will be switched off at the same time so that the two energy storage inverters are powered off simultaneously. In addition, a detection circuit is arranged in the energy storage inverter to detect whether the energy storage inverter is connected to an alternating current line (such as the mains supply line). When both energy storage inverters are connected with the parallel operation connecting device, it indicates that the two energy storage inverters can be connected in parallel, and the signal detected by the detection circuit at this point is transmitted to the CPU, so that the CPU can control to enter the parallel operation mode. It shall be appreciated that, the "AC power supply" connected to the parallel operation connecting device in the present application may be the mains supply or other types of AC power supply, and no limitation is made thereto in the present application. For convenience of description, the present application will be described by taking the mains supply as an example.

The parallel operation connecting device provided according to an embodiment of the present application includes a control switch, a concentrator, a first connector and a second connector. The concentrator is connected between the mains supply and the first connector and the second connector to form two identical mains supply lines, namely, a first mains supply line for introducing the mains supply to the first connector via the concentrator and a second mains supply line for introducing the mains supply to the second connector via the concentrator. The on-off of both the first mains supply line and the second mains supply line is controlled by the control switch. The first connector is configured to be adaptively connected with a first energy storage inverter, and the second connector is configured to be adaptively connected with a second energy storage inverter. The connection of the control switch is configured such that: when the first connector is connected to the first energy storage inverter and the second connector is connected to the second energy storage inverter, the control switch is turned on to simultaneously switch on the first mains supply line and the second mains supply line; when the first connector is disconnected from the first energy storage inverter and/or when the second connector is disconnected from the second energy storage inverter, the control switch is turned off to simultaneously switch off the first mains supply line and the second mains supply line. That is, as long as one of the first connector and the second connector is not connected with the energy storage inverter, the control switch is in the off state, so that the first mains supply line and the second mains supply line are switched off at the same time. In some embodiments, the energy storage inverter is a bidirectional energy storage inverter.

In some embodiments, the parallel operation connecting device may further include a plug for connecting with the mains supply, one end of the plug for connecting with the mains supply can be inserted into the mains supply connection socket, and the other end thereof is connected with the first end of the concentrator. The first connector and the second connector are provided with plugs capable of mating with the energy storage inverters, and both the first connector and the second connector are provided with electrical connection wires and signal wires. Each of the first connector and the second connector has three electrical connection wires, which correspond to live wire, neutral wire and ground wire respectively. The first end of the concentrator is connected with the mains supply, the electrical connection wires of the first connector are connected with the second end of the concentrator to form the first mains supply line, and the electrical connection wires of the second connector are connected with the second end of the concentrator to form the second mains supply line.

The control switch is a kind of switch, such as a relay, a circuit breaker, etc., which can control the switch to be turned on as long as the control component thereof is energized. A switch component of the control switch (such as the contact of a relay) is connected to the collector wire within the concentrator for controlling the on-off of the collector wire. The signal wires of the first connector and the second connector are respectively connected with both ends of the control component of the control switch. Specifically, both ends of the control component of the control switch (such as the coil of a relay) are configured such that one end can be connected to the first bidirectional energy storage inverter through the signal wires of the first connector, and the other end can be connected to the second bidirectional energy storage inverter through the signal wires of the second connector. When the first connector is connected to the first bidirectional energy storage inverter and the second connector is connected to the second bidirectional energy storage inverter, both ends of the control component of the control switch form a control loop through the signal wires of the first connector, the internal line of the first energy storage inverter, the internal line of the second energy storage inverter and the signal wires of the second connector, and the first energy storage inverter, the first connector, the control switch, the second connector and the second energy storage inverter are connected in series on the control loop. Only when the first connector and the second connector are respectively connected to the energy storage inverters, the control loop is connected so that the control component of the control switch is powered on and the switch component of the control switch is turned on. After the control switch is turned on, the mains supply is respectively transmitted to the first connector and the second connector through the collector wire, and then the two energy storage inverters are connected to the mains supply lines, so that the two energy storage inverters can be powered on at the same time. When one of the first connector and the second connector is not connected to the energy storage inverter, both ends of the control component of the control switch fails to form a control loop through the signal wires of the first connector, the internal line of the first energy storage inverter, the internal line of the second energy storage inverter and the signal wires of the second connector, and the control component of the control switch is powered off, so that the switch component of the control switch is turned off. That is, as long as one of the energy storage inverters is disconnected from the connector to which it is originally connected, the whole control loop will be disconnected, and the control component of the control switch will be powered off, which makes the control switch in the off state. When the control switch is in the off state, the two energy storage inverters will be disconnected from the mains supply lines at the same time so that the two energy storage inverters are powered off simultaneously.

In some embodiments, each of the first connector and the second connector has a first signal wire, a second signal wire and a third signal wire. One end of the control component of the control switch is connected to the first signal wire of the first connector and the other end thereof is connected to the third signal wire of the second connector. The second signal wire of the first connector is connected with the second signal wire of the second connector. When the connector is connected with the energy storage inverter, the first signal wire, the second signal wire and the third signal wire are correspondingly connected with a first interface, a second interface and a third interface of the energy storage inverter respectively, wherein the first interface and the second interface of the energy storage inverter are respectively a power supply terminal and a ground terminal of the energy storage inverter, and the second interface of the energy storage inverter is connected with the third interface of the energy storage inverter. Further speaking, each of the first connector and the second connector has a fourth signal wire, and the fourth signal wire is connected with the second signal wire within the connector (the first connector/the second connector). When the connector is connected with the energy storage inverter, the fourth signal wire is connected with the fourth interface of the energy storage inverter to provide the energy storage inverter with an identification signal indicating connection with the connector. The identification signal may be received and detected by the detection circuit in the energy storage inverter (the structure and principle of the detection circuit will be detailed later).

In some embodiments, the control switch is a relay, the control switch has a contact set and a control coil, the contact set is connected to the collector wire of the concentrator for controlling the on-off of the collector wire, one end of the control coil is connected to the first signal wire of the first connector, and the other end of the control coil is connected to the third signal wire of the second connector.

In some embodiments, the first connector is a plug for connecting with the first energy storage inverter, and the second connector is a plug for connecting with the second energy storage inverter. In some embodiments, the concentrator, the first connector and the second connector of the parallel operation connecting device may be integrally formed. Alternatively, the concentrator, the first connector and the second connector are formed separately and then assembled together to form the parallel operation connecting device.

Figure 3:
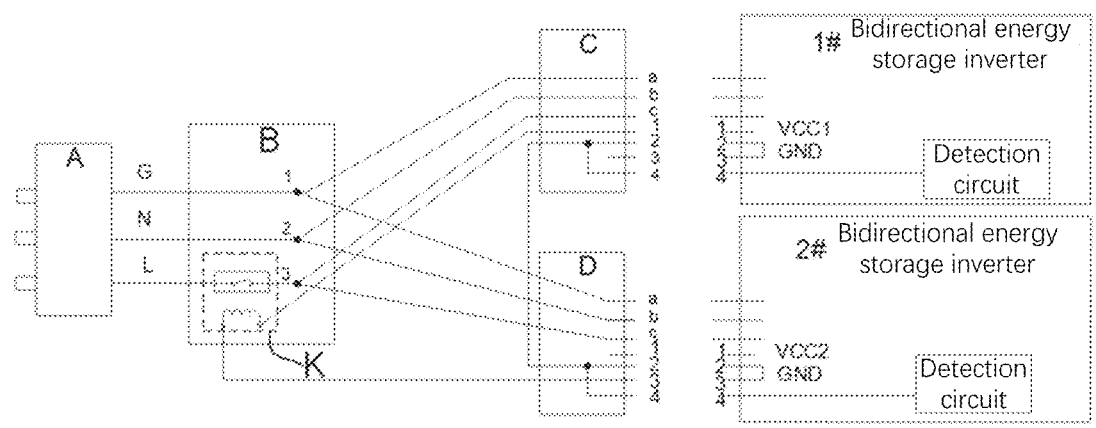
FIG. 3 is a schematic view illustrating the principle of a parallel operation connecting device for parallel operation of portable bidirectional energy storage inverters according to an embodiment of the present application.

The present application will be explained in more detail through a specific example hereinafter. Referring to FIG. 3, a parallel operation connecting device provided according to an embodiment of the present application includes four parts: A, B, C and D, wherein A is a plug for connecting with the mains supply (plugs equipped according to different national markets) and it may be connected to any mains supply socket; B is a collection point of the lines (the concentrator); C is a plug arranged on the first connector for connecting with the energy storage inverter; and D is a plug arranged on the second connector for connecting with the energy storage inverter.

Specifically, one end of the plug A may be inserted into the mains supply socket, and G wire (ground wire), L wire (live wire) and N wire (neutral wire) simultaneously enter the concentrator B at the other end of the plug A. Within the concentrator B, a control switch (such as a relay, a circuit breaker, etc.), which can control the switch to be turned on when it is energized, is added to the L wire. A relay is shown in FIG. 3, but it is not limited thereto. In addition to three electrical connection wires L, G, and N (wherein a stands for G wire, B stands for N wire, and C stands for L wire), the plugs C and D for connecting with the energy storage inverters have four signal wires. The connection is performed as follows: pin 1 of the plug C is connected to one end of a coil of the relay in the concentrator B, and the other end of the coil is connected to pin 3 of the plug D; pins 2 and 4 of the plug C are short-circuited and then connected to pins 2 and 4 of the plug D (pins 2 and 4 of the plug D are also short-circuited). Pin 3 of the plug C and pin 1 of the plug D are vacant.

Figure 4:
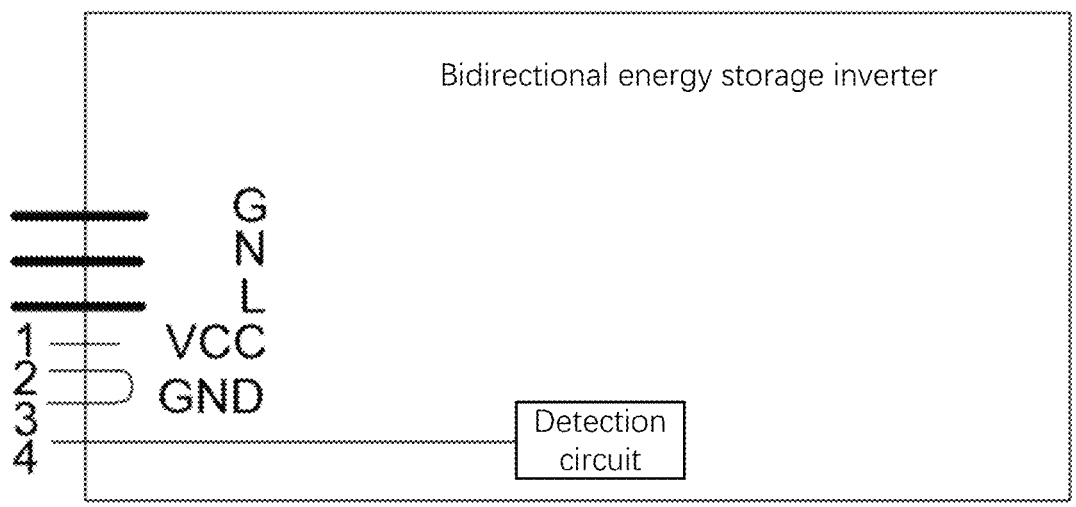
FIG. 4 is a schematic view of a bidirectional energy storage inverter according to an embodiment of the present application.
Figure 5:
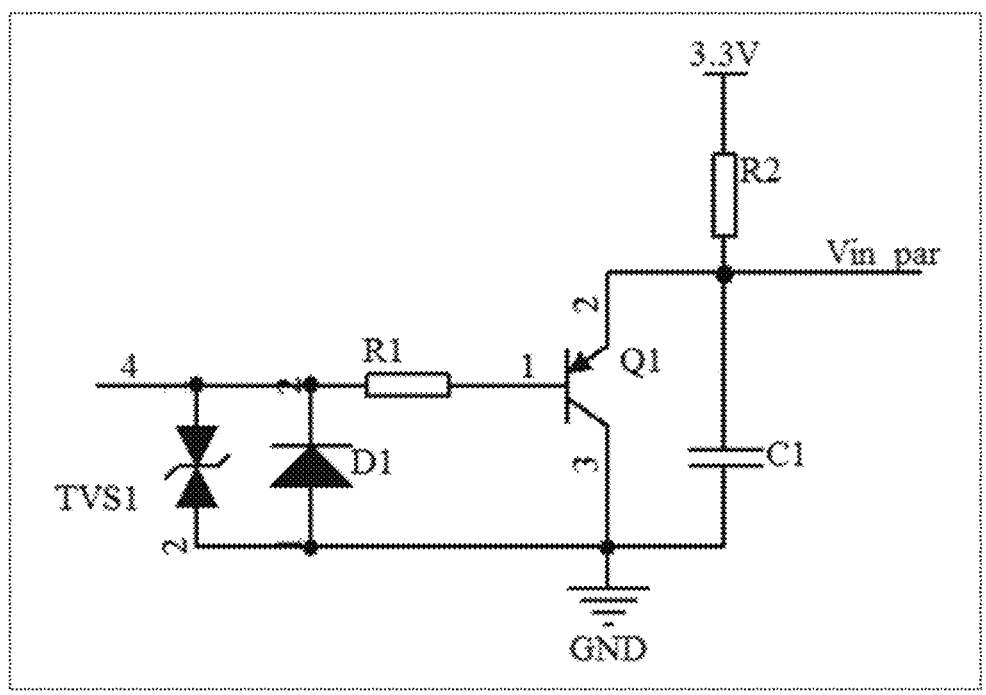
FIG. 5 is a schematic view illustrating the principle of a detection circuit inside the portable bidirectional energy storage inverter according to an embodiment of the present application.

Referring to FIG. 4, the energy storage inverter adapted to the parallel operation connecting device in the embodiment of the present application has sockets adapted to the plugs C and D. In addition to three electrical connection wires G, L and N, the energy storage inverter has four signal wires, and the connection of these four signal wires is performed as follows: pin 1 is connected to VCC (for example, 12V), pins 2 and 3 are connected together and grounded at the same time, and pin 4 is connected to an internal detection circuit. The detection circuit is as shown in FIG. 5, wherein Vin_par is the detection signal input to the line, which is connected to the input pin of the CPU (not shown in the figure) for sending the signal to the CPU for detection.

As shown in FIG. 3, because ends a, b and c of the plug C and the plug D are connected to ends 1, 2 and 3 (three wires G, N and L) in the concentrator B together, when the plug A is inserted into the mains supply socket, the mains supply lines connected to ends a/b/c of the plug C and the plug D are the same, thereby ensuring that the L/N wires can be connected correctly without considering the phase sequence when the energy storage inverters are connected in parallel.

Still referring to FIG. 3, a relay K is connected on the L wire of the concentrator B, and the coil end of the relay K is connected with the plugs C and D respectively. Moreover, the plugs C and D are designed differently, wherein pin 1 of the plug C is connected with one end of the relay coil, and the other end of the relay coil is connected with pin 3 of the plug D. Pins 2 and 4 of the plug C are short-circuited, pins 2 and 4 of the plug D are short-circuited, and pin 2 of the plug C is connected with pin 2 of the plug D. The two energy storage inverters have identical input interface circuits. In this way, no matter which inverter the plugs C and D are connected to, parallel operation can be realized as long as the plugs C and D are connected to the two inverters. When the plugs C and D are inserted into 1 #bidirectional energy storage inverter and 2 #bidirectional energy storage inverter respectively, the pin 1 VCC of the 1 #inverter is connected to pins 2 and 3 of the 2 #inverter through pin 1 of the plug C, the coil of the relay K and pin 3 of the plug D in turn, then it goes to pin 2 of the plug C through pin 2 of the plug D, and finally returns to pin 2 of the 1 #inverter, thereby forming a control loop. The connection is performed in a serial connection mode, and the mains supply of the two inverters will be switched off simultaneously as long as the wire of one of the inverters falls off (disconnected from the plug C/D) or is manually unplugged. The mains supply is switched off at the port of the plug, so the hanging plug will not pose the risk of electric shock, and the risk of damage to the machine caused by abnormal mains supply input in a single inverter during the parallel operation is avoided. Moreover, unified mains supply input is realized during the parallel operation. For example, the plug A may be equipped with different terminals according to different markets without considering the phase sequence of the two inverters, and mains supply input of the same frequency and same phase for the two inverters can be realized simply by connecting with the parallel operation connecting device. Moreover, only after the two inverters are properly connected with the plugs C and D respectively, the control switch (such as the relay K) can be turned on, and after the switch is turned on, the mains supply line from the concentrator B to the 1 #energy storage inverter through the plug C and the mains supply line from the concentrator B to the 2 #energy storage inverter through the plug D can be switched on, which meets the connection conditions of mains supply input during parallel operation. At this time, as long as the plug A is inserted into the mains supply, the two energy storage inverters may be powered on at the same time.

In the parallel operation apparatus according to the embodiment of the present application, each of the two energy storage inverters is provided with a detection circuit therein. Specifically, a first detection circuit is arranged in the 1 #energy storage inverter, the first end of the first detection circuit is connected to the fourth interface (pin 4) of the 1 #energy storage inverter, and the second end of the first detection circuit is connected to the CPU for detecting whether the 1 #energy storage inverter is connected to the mains supply line, e.g., whether the 1 #energy storage inverter is connected to the first connector. A second detection circuit is arranged in the 2 #energy storage inverter, the first end of the second detection circuit is connected to the fourth interface (pin 4) of the 2 #energy storage inverter, and the second end of the second detection circuit is connected to the CPU for detecting whether the 2 #energy storage inverter is connected to another mains supply line, e.g., whether the 2 #energy storage inverter is connected to the second connector. When the first connector is connected with the 1 #energy storage inverter, the fourth signal wire of the first connector is connected with the fourth interface (pin 4) of the 1 #energy storage inverter, so as to provide the 1 #energy storage inverter with an identification signal indicating connection with the first connector. After the identification signal enters the first detection circuit, the first detection circuit outputs a signal indicating that the 1 #energy storage inverter is connected with the first connector to the CPU. Similarly, when the second connector is connected with the 2 #energy storage inverter, the fourth signal wire of the second connector is connected with the fourth interface (pin 4) of the 2 #energy storage inverter to provide the 2 #energy storage inverter with an identification signal indicating connection with the first connector. After the identification signal enters the second detection circuit, the second detection circuit outputs a signal indicating that the 2 #energy storage inverter is connected with the second connector to the CPU.

In some embodiments, the first detection circuit and the second detection circuit have the same circuit configuration. Referring to FIG. 5, the detection circuit in the energy storage inverter is mainly composed of a PNP triode Q1, a resistor R1 (several ohms), a resistor R2 (10KΩ, pull-up 3.3V), a capacitor C1, a diode D1 and a transient diode TVS1. Port 4 of the detection circuit is connected to pin 4 of the energy storage inverter, and Vin par is connected to the input pin of a CPU. When the parallel operation connecting device is not connected to the energy storage inverter, the pin 4 of the energy storage inverter is suspended, Q1 is in the off state, and at this time, Vin par is at a high level. Referring to FIG. 3 and FIG. 4 together, when the plug (here, the plug C or D) is not connected to any energy storage inverter, pin 4 of the energy storage inverter is suspended, Q1 is in the off state, and at this time, VIN PAR is at a high level. The CPU can accordingly determine that the energy storage inverter is not connected to the mains supply line. On the contrary, when the plug (here, the plug C or D) is inserted into one of the energy storage inverters, pins 2 and 4 are short-circuited inside the energy storage inverter, the signal of the pin 4 of the energy storage inverter is pulled to GND, Q1 is turned on, and Vin_par originally at a high level is turned into a low level and sent to the CPU for detection. The CPU detects the low level and confirms that the mains supply input line is connected. That is, when the plugs C and D of the parallel operation connecting device are respectively connected with the two energy storage inverters, and it is detected by both the detection circuits of the two energy storage inverters that the mains supply lines are connected, then the parallel operation mode may be implemented. At this time, as long as the plug A is inserted into the mains supply, mains supply input of the same frequency and same phase can be provided for the two energy storage inverters.

It shall be noted that in another embodiment, the pin 4 of the plug C may also be connected to pin 1 instead of being connected to pin 2 as mentioned above. Similarly, pin 4 of the plug D may also be connected to pin 1 instead. The detection circuit is correspondingly adjusted to change Q1 into a NPN type triode. In this case, when the energy storage inverter is connected to the plug (the plug C or D), pin 4 in the energy storage inverter is pulled to VCC (high level), Q1 is turned on, and Vin_par originally at a high level is turned into a low level and sent to the CPU for detection. This connection mode and detection circuit can also detect whether the energy storage inverter is connected to the connector.

Beneficial effects of the present application lie in that: the parallel operation connecting device described above in the present application can ensure that the L/N wires can be correctly connected when the energy storage inverters are connected in parallel without considering the phase sequence, because the alternating current power line connected with the first connector is the same as the alternating current power line connected with the second connector. Meanwhile, because the control switch is turned on only when the first connector and the second connector are respectively connected with the energy storage inverters, the alternating current power lines of the two energy storage inverters are switched on at the same time, thereby realizing the function of being powered-on simultaneously. Moreover, as long as one of the energy storage inverters is disconnected, the control switch will be turned off so that the alternating current power lines of the two energy storage inverters are switched off simultaneously, thereby realizing the function of being powered-off simultaneously. In this way, the risk that one inverter is damaged due to the abnormal power input of the other inverter during parallel operation is avoided, and unified power input for the two inverters during parallel operation is realized so that it is unnecessary to take the phase sequence of input of the two inverters into consideration, and alternating current input of the same frequency and same phase for the two energy storage inverters can be realized simply by connecting the first connector of the parallel operation connecting device with one energy storage inverter and connecting the second connector with the other energy storage inverter. Additionally, the control switch can be turned on only after both the energy storage inverters are properly connected with the parallel operation connecting device, so that parallel operation can be realized simply by connecting the parallel operation connecting device with the two energy storage inverters with or without an alternating current power supply.

In addition, the detection circuit in the energy storage inverter may detect whether the energy storage inverter is connected to the alternating current power line. When it is detected that the energy storage inverter is connected to the alternating current power line, it indicates that the two inverters can be connected in parallel. At this point, the signal output by the detection circuit is transmitted to the CPU, and the CPU may control to enter the parallel operation mode. It is unnecessary to set the parallel operation function on each of the inverters through the panel, so this solution is very reliable and convenient to solve the problem of inputting during parallel operation of bidirectional inverters.

What described above is further detailed description of the present application made in combination with specific preferred embodiments, and it should not be construed that the specific implementation of the present application is limited to these descriptions. For those skilled in the art to which the present application belongs, several equivalent substitutions or obvious variations can be made without departing from the concept of the present application, and these equivalent substitutions or obvious variations have the same performances or uses and thus should be regarded as within the scope claimed in the present application.

The invention claimed is:

1. A parallel operation connecting device, comprising a control switch, a concentrator, a first connector and a second connector;
   wherein the concentrator is connected between an alternating current power supply and the first connector and the second connector to form two identical alternating current lines, and on-off of both of the two alternating current lines is controlled by the control switch;
   the first connector is configured to be adaptively connected with a first energy storage inverter, the second connector is configured to be adaptively connected with a second energy storage inverter;
   the control switch is configured to turn on to simultaneously switch on the two alternating current lines, when the first connector is connected to the first energy storage inverter and the second connector is connected to the second energy storage inverter;
   the control switch is further configured to turn off to simultaneously switch off the two alternating current lines, when the first connector is disconnected from the first energy storage inverter and/or when the second connector is disconnected from the second energy storage inverter;

wherein each of the first connector and the second connector has a signal wire, and the signal wires of the first connector and the second connector are respectively connected with both ends of a control component of the control switch;

when the first connector is connected to the first energy storage inverter and the second connector is connected to the second energy storage inverter, both ends of the control component of the control switch form a control loop through the signal wire of the first connector, an internal line of the first energy storage inverter, an internal line of the second energy storage inverter and the signal wire of the second connector to control the control switch to be turned on.

2. The parallel operation connecting device according to claim 1, wherein a collector wire is built in the concentrator, and a switch component of the control switch is connected to the collector wire for controlling on-off of the collector wire; a first end of the collector wire is connected with the alternating current power supply, a second end of the collector wire is connected with an electrical connection wire of the first connector to form a first alternating current line; the second end of the collector wire is further connected with an electrical connection wire of the second connector to form a second alternating current line, and the first alternating current line and the second alternating current line are the said two identical alternating current lines.

3. The parallel operation connecting device according to claim 2, wherein there are three electrical connection wires for each of the first connector and the second connector, which correspond to live wire, neutral wire and ground wire respectively.

4. The parallel operation connecting device according to claim 2, wherein when one of the first connector and the second connector is not connected to the corresponding energy storage inverter, both ends of the control component of the control switch fail to form a control loop through the signal wire of the first connector, the internal line of the first energy storage inverter, the internal line of the second energy storage inverter and the signal wire of the second connector, and the control component of the control switch loses power so that the switch component of the control switch is turned off.

5. The parallel operation connecting device according to claim 2, wherein the control switch is a relay comprising a contact set and a control coil, wherein the contact set is connected to the collector wire of the concentrator for controlling the on-off of the collector wire, one end of the control coil is connected to the first signal wire of the first connector, and another end of the control coil is connected to the third signal wire of the second connector.

6. The parallel operation connecting device according to claim 1, wherein each of the first connector and the second connector has a first signal wire, a second signal wire and a third signal wire; one end of the control component of the control switch is connected to the first signal wire of the first connector and another end of the control component is connected to the third signal wire of the second connector; the second signal wire of the first connector is connected with the second signal wire of the second connector;

for each of the first connector and second connector, when the first connector is connected with the first energy storage inverter and the second connector is connected with the second energy storage inverter, the first signal wire, the second signal wire and the third signal wire are correspondingly connected with a first interface, a second interface and a third interface of the energy storage inverter respectively, wherein the first interface and the second interface of the energy storage inverter are respectively a power supply terminal and a ground terminal of the energy storage inverter, and the second interface of the energy storage inverter is connected with the third interface of the energy storage inverter.

7. The parallel operation connecting device according to claim 6, wherein each of the first connector and the second connector has a fourth signal wire which is connected with the second signal wire within the connector;

for each of the first connector and second connector, when the first connector is connected with the first energy storage inverter and the second connector is connected with the second energy storage inverter, the fourth signal wire is connected with a fourth interface of the energy storage inverter to provide the energy storage inverter with an identification signal for indicating connection with the connector.

8. The parallel operation connecting device according to claim 1, wherein the first connector is a plug for connecting with the first energy storage inverter, and the second connector is a plug for connecting with the second energy storage inverter.

9. The parallel operation connecting device according to claim 1, wherein the concentrator, the first connector and the second connector are integrally formed.

10. The parallel operation connecting device according to claim 1, wherein the parallel operation connecting device further comprises a plug for connecting with the alternating current power supply, wherein one end of the plug for connecting with the alternating current power supply are capable of being inserted into an alternating current power supply socket, and another end of the plug is connected with the concentrator.

11. A parallel operation apparatus, comprising:
a parallel operation connecting device:
a first energy storage inverter connected to the parallel operation connecting device and a second energy storage inverter connected to the parallel operation connecting device; wherein the parallel operation connecting device comprises a control switch, a concentrator, a first connector and a second connector;

wherein the concentrator is connected between an alternating current power supply and the first connector and the second connector to form two identical alternating current lines, and on-off of both of the two alternating current lines is controlled by the control switch;

the first connector is configured to be adaptively connected with a first energy storage inverter, the second connector is configured to be adaptively connected with a second energy storage inverter;

the control switch is configured to turn on to simultaneously switch on the two alternating current lines, when the first connector is connected to the first energy storage inverter and the second connector is connected to the second energy storage inverter;

the control switch is further configured to turn off to simultaneously switch off the two alternating current lines, when the first connector is disconnected from the first energy storage inverter and/or when the second connector is disconnected from the second energy storage inverter;

wherein each of the first connector and the second connector has a signal wire, and the signal wires of the first connector and the second connector are respectively connected with both ends of a control component of the control switch;

when the first connector is connected to the first energy storage inverter and the second connector is connected to the second energy storage inverter, both ends of the control component of the control switch form a control loop through the signal wire of the first connector, an internal line of the first energy storage inverter, an internal line of the second energy storage inverter and the signal wire of the second connector to control the control switch to be turned on.

12. The parallel operation apparatus according to claim 11, wherein a first detection circuit is arranged in the first energy storage inverter for detecting whether the first energy storage inverter is connected to one of the two identical alternating current lines;

a second detection circuit is arranged in the second energy storage inverter for detecting whether the second energy storage inverter is connected to the other of the two identical alternating current lines.

13. The parallel operation apparatus according to claim 11, wherein when one of the first connector and the second connector is not connected to the energy storage inverter, both ends of the control component of the control switch fail to form a control loop through the signal wire of the first connector, the internal line of the first energy storage inverter, the internal line of the second energy storage inverter and the signal wire of the second connector, and the control component of the control switch loses power so that a switch component of the control switch is turned off.

14. The parallel operation apparatus according to claim 11, wherein each of the first connector and the second connector has a first signal wire, a second signal wire and a third signal wire;

one end of the control component of the control switch is connected to the first signal wire of the first connector and another end of the control component is connected to the third signal wire of the second connector; the second signal wire of the first connector is connected with the second signal wire of the second connector;

for each of the first connector and second connector, when the first connector is connected with the first energy storage inverter and the second connector is connected with the second energy storage inverter, the first signal wire, the second signal wire and the third signal wire are correspondingly connected with a first interface, a second interface and a third interface of the energy storage inverter respectively, wherein the first interface and the second interface of the energy storage inverter are respectively a power supply terminal and a ground terminal of the energy storage inverter, and the second interface of the energy storage inverter is connected with the third interface of the energy storage inverter.

15. The parallel operation apparatus according to claim 14, wherein each of the first connector and the second connector has a fourth signal wire which is connected with the second signal wire within the connector;

for each of the first connector and second connector, when the first connector is connected with the first energy storage inverter and the second connector is connected with the second energy storage inverter, the fourth signal wire is connected with a fourth interface of the energy storage inverter to provide the energy storage inverter with an identification signal for indicating connection with the connector.

16. The parallel operation apparatus according to claim 14, wherein the control switch is a relay comprising a contact set and a control coil, wherein the contact set is connected to a collector wire of the concentrator for controlling on-off of the collector wire, one end of the control coil is connected to the first signal wire of the first connector, and another end of the control coil is connected to the third signal wire of the second connector.

17. The parallel operation apparatus according to claim 11, wherein the first connector is a plug for connecting with the first energy storage inverter, and the second connector is a plug for connecting with the second energy storage inverter.

18. The parallel operation apparatus according to claim 11, wherein the concentrator, the first connector and the second connector are integrally formed.

\* \* \* \* \*